United States Patent [19]
Chiu

[11] 3,943,059

[45] *Mar. 9, 1976

[54] PROCESS OF DISPLACING OIL IN SUBTERRANEAN RESERVOIR EMPLOYING AQUEOUS SURFACTANT SYSTEMS

[75] Inventor: Ying C. Chiu, Houston, Tex.

[73] Assignee: Shell Oil Company, Houston, Tex.

[ * ] Notice: The portion of the term of this patent subsequent to July 16, 1991, has been disclaimed.

[22] Filed: July 17, 1974

[21] Appl. No.: 489,307

Related U.S. Application Data

[60] Continuation-in-part of Ser. No. 448,326, March 5, 1974, Pat. No. 3,892,668, which is a division of Ser. No. 351,738, April 16, 1973, Pat. No. 3,823,774, which is a continuation-in-part of Ser. Nos. 235,039, March 15, 1972, abandoned, and Ser. No. 235,088, March 15, 1972, abandoned.

[52] U.S. Cl............ 252/8.55 D; 166/273; 166/274; 166/275

[51] Int. Cl.² ........................................ E21B 43/20

[58] Field of Search ....... 252/8.55 D; 166/275, 273, 166/274

[56] References Cited
UNITED STATES PATENTS

| | | | |
|---|---|---|---|
| 3,258,071 | 6/1966 | Shen | 252/8.55 X |
| 3,303,879 | 2/1967 | Williams | 166/275 |
| 3,330,344 | 7/1967 | Reisberg | 166/275 |
| 3,336,221 | 8/1967 | Ralston | 252/8.55 X |
| 3,368,978 | 2/1968 | Irant | 252/545 X |
| 3,481,869 | 12/1969 | Jones | 252/181 X |
| 3,498,379 | 3/1970 | Murphy | 166/275 |
| 3,823,774 | 7/1974 | Chiu | 166/275 X |

*Primary Examiner*—Herbert B. Guynn

[57] ABSTRACT

In an aqueous anionic surfactant system, the multivalent cation tolerance is improved by the presence of both a solute which inhibits crystal growth and a solute which forms crystalline precipitates of multivalent cations.

3 Claims, 3 Drawing Figures

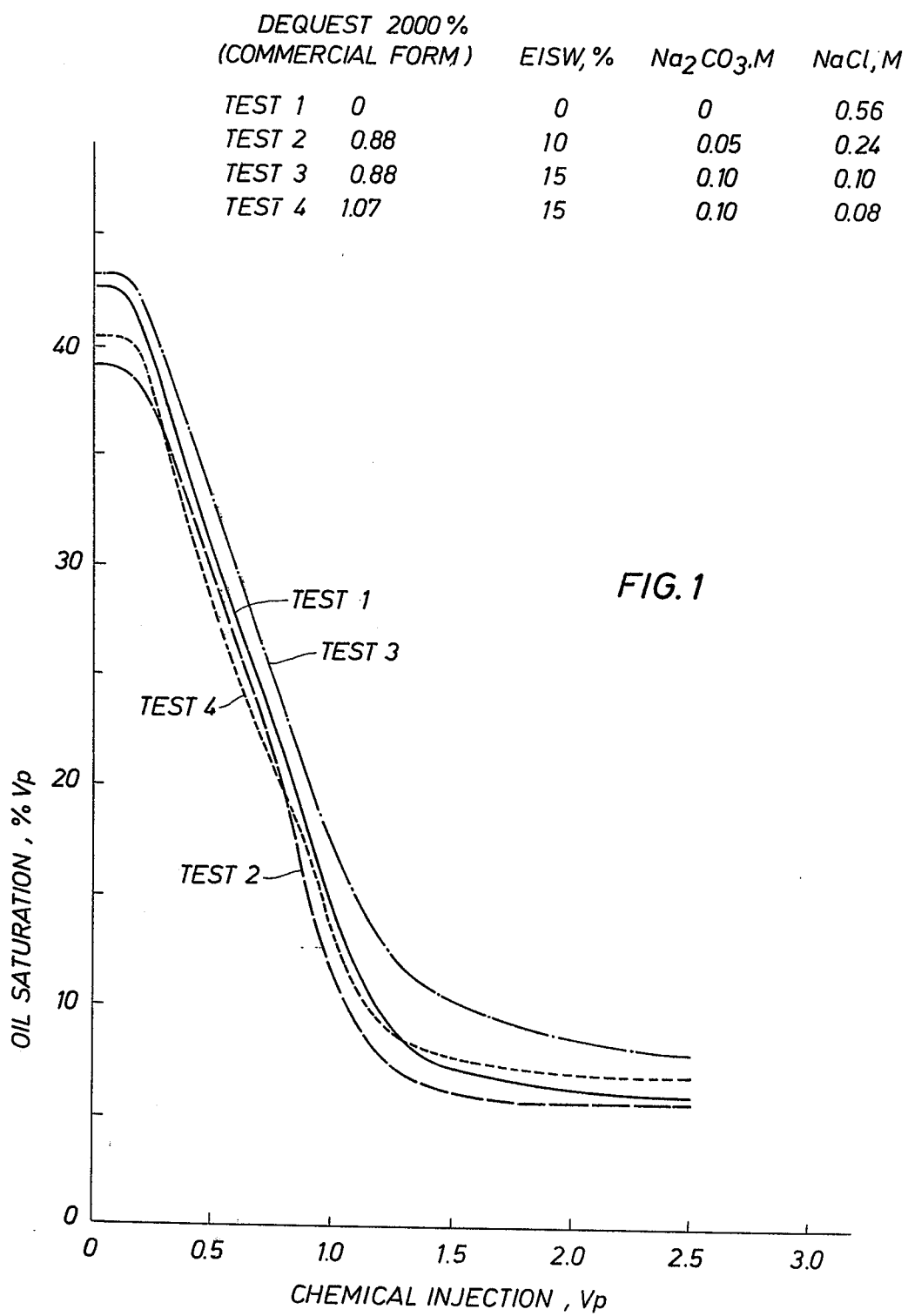

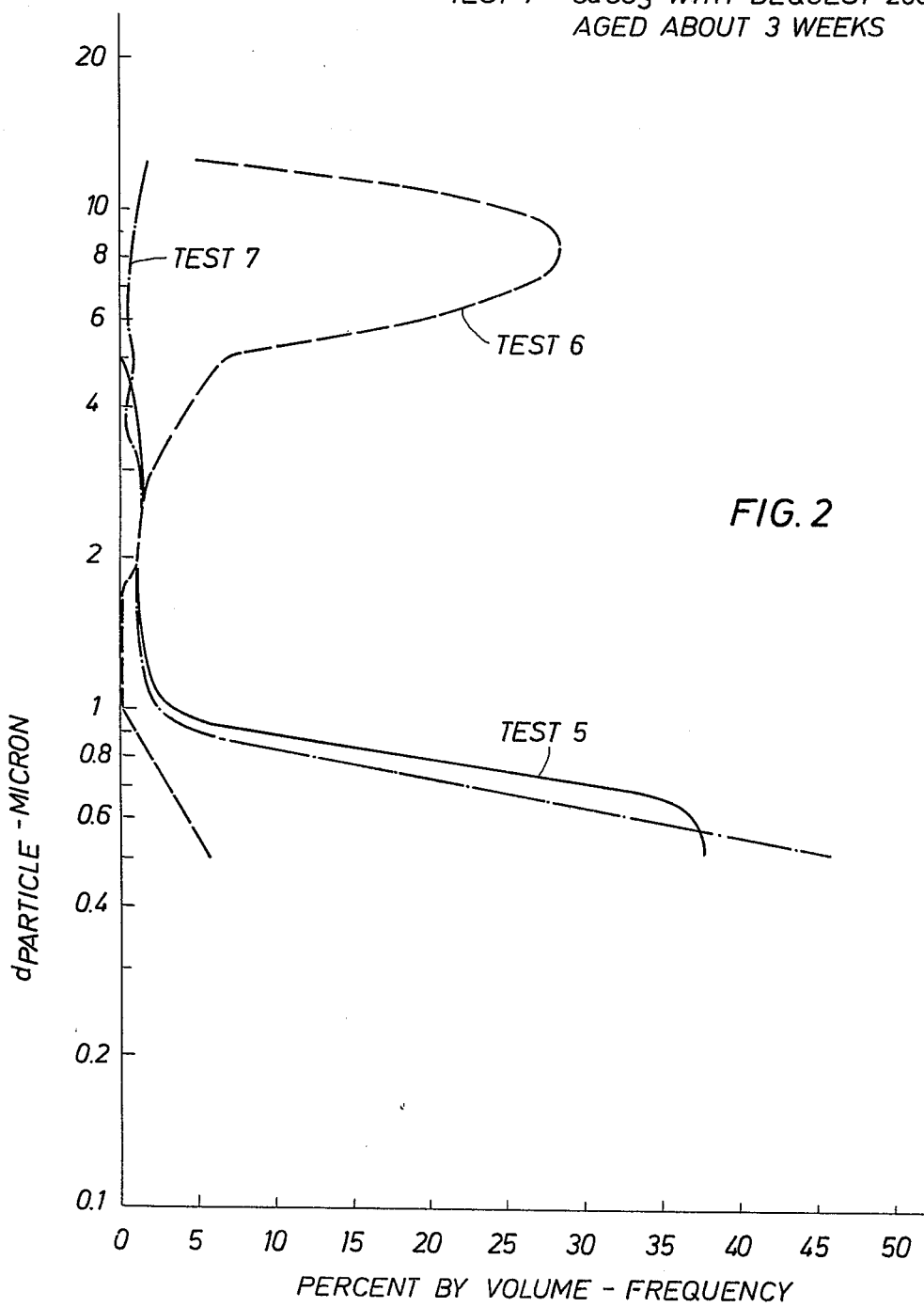

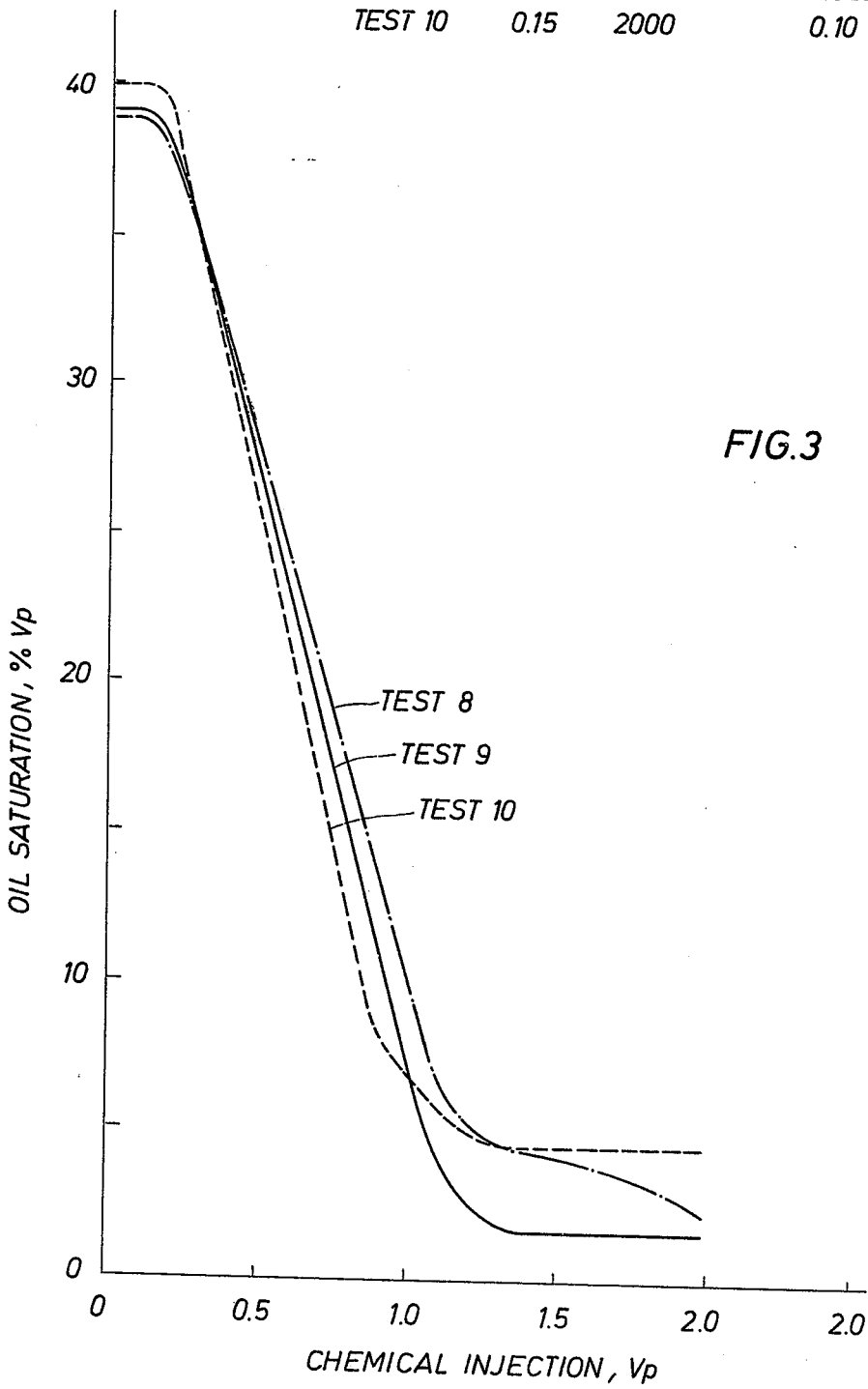

3,943,059

PROCESS OF DISPLACING OIL IN SUBTERRANEAN RESERVOIR EMPLOYING AQUEOUS SURFACTANT SYSTEMS

RELATED PATENT APPLICATIONS

This application is a continuation-in-part of the application Ser. No. 448,326, filed Mar. 5, 1974, (now U.S. Pat. No. 3,892,668) which was a division of the application Ser. No. 351,738, filed Apr. 16, 1973, (now Patent 3,823,774) which was a continuation-in-part of both the application Ser. No. 235,039 filed Mar. 15, 1972 (now abandoned) and application Ser. No. 235,088, filed Mar. 15, 1972 (now abandoned).

BACKGROUND OF THE INVENTION

This invention relates to a process for displacing oil within a permeable material such as a subterranean reservoir. More particularly, it relates to a process for displacing oil within a permeable material in which the oil is mixed with an aqueous solution containing multivalent cations.

It was previously known that aqueous anionic surfactant systems are particularly effective and efficient for displacing oil within permeable materials such as subterranean reservoirs. Such processes have been used for chemical flood-type oil recovery operations, for well treatments to displace residual oil from locations in which it impedes the permeability to aqueous fluid, and the like. Such aqueous anionic surfactant systems include surface active salts or soaps of organic or inorganic acids and the systems may be pre-formed or, at least to some extent formed within the material in which the oil is being displaced. As disclosed in the J. Reisberg U.S. Pat. No. 3,174,542, the acids that form surface active soaps can be injected ahead of an aqueous alkali that forms such a soap. Mixtures of relatively water-soluble and relatively water-insoluble petroleum sulfonates in an aqueous solution of electrolytes are described in the J. Reisberg U.S. Pat. Nos. 3,330,344 and 3,348,611. Aqueous liquid systems containing anionic surfactants electrolytes and water-thickening materials are described in the H. J. Hill — D. R. Thigpen U.S. Pat. No. 3,768,560, etc.

Although aqueous anionic surfactant systems are generally particularly effective and efficient in displacing oil, they exhibit a relatively low tolerance towards aqueous solutions containing multivalent cations. Such cations tend to reduce or destroy the efficiency of the system by precipitating multivalent cation salts of the anions of the surfactant or inducing a phase separation of the surfactant system components, of the like. Such problems are discussed in patents such as the J. Reisberg, J. B. Lawson U.S. Pat. No. 3,508,612, the R. F. Farmer, J. B. Lawson, W. M. Sawyer, Jr. U.S. Pat. NO. 3,675,716, U.S. Pat. No. 3,799,264, etc. As indicated by such patents, prior processes for eliminating the deleterious effects of multivalent cations have involved mixing sulfonate surfactants with alkoxylated alcohol sulfate surfactants; or using aqueous surfactant systems containing a mixture of a sulfated aliphatic anionic surfactant, a non-ionic surfactant, and a water-soluble quanidine compound, or the like.

SUMMARY OF THE INVENTION

The present invention relates to displacing oil within a permeable material by contacting and pushing the oil with an aqueous anionic surfactant system that contains both a dissolved crystal growth inhibiting material and a dissolved multivalent cation precipitating material that forms a crystalline precipitate of a multivalent cation.

DESCRIPTION OF THE DRAWING

FIG. 1 shows a graph of the variation in oil saturation in a core with amount of chemical injected.

FIG. 2 shows a graph of the particle size distribution in various solutions.

FIG. 3 shows a graph of the variation in oil saturation in a core with amount of chemical injected.

DESCRIPTION OF THE INVENTION

The present invention is, at least in part, premised on a discovery that, certain scale inhibitors which are also crystal growth inhibitors can be utilized to increase the multivalent cation tolerance of an aqueous anionic surfactant system (such as one containing salts or soaps of surface active acids such as sulfonic or naphthenic acids or an aqueous digested alkaline tall oil pitch soap composition, or the like). The increased tolerance is obtained by dissolving in the surfactant system at least one multivalent cation-precipitating material that forms a crystalline precipitate of a multivalent cation (such as a salt containing multivalent cation-precipitating anions, e.g. carbonate, sulfate, or phosphate, etc.) in combination with a crystal-growth-controlling scale inhibitor that is substantially inert with respect to the surface activity of the surfactant system (such as certain organic or inorganic phosphates). The inclusion of such a combination of solutes provides a dynamically inhibited surfactant system in which a relatively large amount of protection is provided by a relatively small amount of the crystal-growth-inhibiting additive. A particularly suitable combination of precipitation-initiating and scale-inhibiting materials comprises that a sodium carbonate and the sodium salt of amino tris(-methylphosphonic acid). A suitable sodium salt of amino tris(methylphosphonic acid) is available from the Monsanto Chemical Company under the trade name Dequest 2006. The acid form of amino tris(methylphosphonic acid) is available under the trade name Dequest 2000.

The aqueous anionic surfactant system to which this invention is applicable can contain substantially any mixture of anionic surfactants and electrolytes (and, if desired, water thickeners or co-surfactants or co-solvents or semi-polar material or emulsion modifiers) that are adapted to form an aqueous surfactant system having an interfacial tension of less than about 0.01 dyne per centimeter against the oil-containing fluid to be displaced within a permeable material. Such surfactant systems can be utilized in combination with the components or techniques such as those proposed for preparing and using oil-displacing chemical slugs in patents such as the above-mentioned Reisberg, Hill and Thigpen patents and the application of which the present application is a continuation in part. Such surfactant systems can be pre-formed or formed in situ. Such surfactant systems or "chemical slugs" are preferably injected ahead of a thickened slug of an aqueous drive fluid.

Particularly suitable surfactants for use in this invention comprise digested alkaline tall oil pitch soap compositions produced by heating a mixture of tall oil pitch and excess aqueous alkali for a time and temperature that produces a substantially completely water-soluble digested soap composition of the type more completely described in the parent patent application. Such soap compositions can be used by themselves, or mixed with petroleum sulfonate surfactants such as those commercially available as: petroleum sulfonates from Bray Chemical Company; Bryton Sulfonates from Bryton Chemical Company; Petronates and Pyronates from Witco Chemical Company; Promor sulfonates from Mobil Oil Company; and the like. Such tall oil acid or pitch soaps, or sulfonates, or other anionic surfactants, are preferably used in mixtures that provide enough relatively high water-soluble anionic surfactant to satisfy the critical concentration for micelle formation and enough relatively water-insoluble amphiphillic material to satisfy the micelle-swelling criteria described in the J. Reisberg U.S. Pat. No. 3,330,344.

The electrolyte content of the present surfactant systems are preferably adjusted to enhance the interfacial tension lowering activity of the system at the temperature at which it is to be used, for example, at the temperature of a subterranean oil reservoir. The salinity of such aqueous solutions or systems can be controlled by, for example, adding alkali metal salts of halogen acids, or other relatively highly water-soluble salts. Such solutions can advantageously be formed from a subterranean brine, sea water, or the like, that is available near the location in which the system is to be used. The sodium and potassium chlorides are particularly suitable electrolytes for use in this invention. Solutions containing from about 0.1 to 5 moles/liter of such salts are generally suitable. Where the oil to be displaced is mixed with a highly saline aqueous solution the electrolyte content of the surfactant system (as injected) is preferably near the lower level.

Where water thickeners are incorporated in the present surfactant systems, or thickened chemical slug-displacing systems injected behind them, such thickeners can comprise substantially any water-soluble polymeric material such as a carboxymethyl cellulose, a polyethylene oxide, a hydroxyethyl cellulose ether, partially hydrolyzed polyalkylamides or copolymers of acrylamide and acrylic acid, biopolymers such as the polysaccharides, or the like.

The crystal growth inhibiting material used in this invention can be substantially any water-soluble crystal growth inhibitor that is adapted to retard the growth of crystals containing multivalent cations and is substantially inert with respect to adversely affecting the interfacial tension lowering activity, of the surfactant system. Such inhibitors are preferably the phosphonic acid substituted amines which are water-soluble or form water-soluble salts. Particularly preferred inhibitors comprise the trimethylphosphonate substituted amines available from Monsanto Chemical Company under the trade name of Dequest.

The multivalent cation precipitating material used in the present invention can comprise substantially any ionic water-soluble material having an anion that forms a crystalline precipitate with a multivalent cation and is compatible with anionic surfactant materials. Suitable precipitating materials include the sodium or potassium carbonates or bicarbonates, the sodium or potassium sulfates or the sodium or potassium phosphates or the sodium or potassium fluorides, or the like.

In the present invention surfactant systems, the combination of the crystal growth inhibitor and multivalent cation precipitator provides a dynamically inhibited system in which a relatively high amount of tolerance to multivalent cations is imparted by a relatively small (nonstoichiometric) proportions of the crystal growth inhibitor. In general, the amounts used should be sufficient to provide a significant increase in the multivalent cation tolerance of the system.

Where the water mixed with the oil to be displaced has a relatively low multivalent cation content, and thus is not a particularly hard water, the concentrations of the crystal growth inhibitor and cation precipitator can be relatively low. Low concentrations can, of course, also be used where it is feasible to displace or dilute a relatively hard water with a softer water prior to the injection of the surfactant system. Concentrations of from about 0.001 to 1 percent crystal growth inhibitor and 0.01 to 0.1 moles/liter multivalent cation precipitator are preferred. The present surfactant systems can be used in displacing oil that is mixed with relatively hard water (i.e. water having a relatively high multivalent cation content). In terms of calcium ion equivalents, such multivalent ion concentrations can be as high as about 4000 parts per million, but are preferably less than about 2500 ppm.

EXAMPLES

Tests 1 to 4 compare the oil displacing efficiencies of aqueous digested alkaline tall oil pitch soap surfactant systems (further described in Ser. No. 351,738, filed Apr. 16, 1973) with and without the presence of a crystal growth inhibitor and multivalent cation-precipitating material. The surfactant systems are essentially similar except for the presence of the indicated amount of the sodium salt of the crystal growth inhibitor, Dequest 2000 and Eugene Island synthetic water (a water solution containing 45,337 ppm $Na^+$, 3741 ppm $Ca^{++}$, 1115 ppm $Mg^{++}$, 756 ppm $Ba^{++}$, and 69,651 ppm $Cl^-$). The test results are shown in FIG. 1. Note that the inhibited surfactant systems were tolerant to the rather high concentrations of monovalent and multivalent cations — amounts that would cause a coagulation of similar surfactant systems that were free of the precipitate-forming and scal inhibiting combination. The pressure drops in cores observed during tests 2 to 4 were similar to those of test 1 and other tests with surfactant systems free of the crystal growth inhibitor, multivalent cation precipitator and multivalent cations.

Tests 5 to 7 compare the particle size distributions of liquids in which calcium carbonate was precipitated in the presence and in the absence of a Dequest crystal growth inhibitor. In test 5, equal volumes of 0.1 molar sodium carbonate were added to an aqueous 0.1 molar calcium chloride solution containing $3 \times 10^{-3}$ moles of Dequest 2000 with stirring. The solution was then diluted to 0.1 of its concentration with aqueous 0.1 molar sodium chloride and promptly analyzed. In test 6, a solution was similarly prepared — without Dequest. In test 7, a solution was similarly prepared but with $4 \times 10^{-3}$ moles of Dequest, and was subjected to about 3-weeks again at room temperature prior to its analysis. The analysis employed a commercially available Coulter Counter (Model T) which measures the change in the resistance of a conducting fluid that occurs as a nonconducting particle flows through a small aperture between two electrodes. When a particle passes through the aperture, the change in resistance produces a voltage pulse which (in theory) is proportional to the volume of the particle.

Graphs of the test results are shown in FIG. 2. Note that without the Dequest the particle size grows to more than the maximum size (i.e., that measurable by the Coulter Counter tube that was used) during a three-week aging period. In contrast, with the Dequest, the particle size remains relatively very small throughout a three-week aging period.

FIG. 3 shows the recovery capability of a Bryton 430 pertroleum sulfonate surfactant system containing calcium ions and Dequest 2000. Core experiments were performed with Benton crude oil in Berea sandstone (10 inches long, 2 inches in diameter) at 70°C. Oil recovery is good (typical for an active aqueous sulfonate sulfactant system) for all runs. An increased rate of oil desaturation is observed as the amount of $NA_2CO_3$ in the slug is increased. The oil cut of the effluent is around 0.3 – 0.4 from test 8 and 0.4 – 0.6 from test 10. Pressure behavior of tests 8 and 9 is similar; the maximum pressure drop is about 1.5 psi. However, the maximum pressure drop of test 10 is above 5 psi (the maximum measurable pressure on the recorder at that time) but it falls to 1 psi at the end of the run. Ordinarily, a 5 percent Bryton 430 solution separates at 1000 ppm $Ca^{++}$ both at room temperature and at 70°C. In the presence of Dequest and $NA_2CO_3$, no separation of Bryton 430 was observed even with 4000 ppm $Ca^{++}$. The $CaCO_3$ formed in the solution ranged from a white colloidal suspension to a colloidal system mixed with some coarse agglomerates depending on the relative concentrations of $Ca^{++}$, $CO_3$ and Dequest and agitation. Since the promotion or inhibition crystal growth depends on kinetics as well as the thermodynamics of the process, the method of preparation and final composition of the system are important factors controlling the final state of the solution.

We have similarly tested the applicability of the Dequest-carbonate combination for increased multivalent ion tolerance of other anionic surfactant solutions. These include: 5 percent Martinez 470 sulfonate (separation of this aqueous solution occurs with 800 ppm $Ca^{++}$ both at room temperature and at 70°C), 5 percent Pyronate 50 (separation occurs at 900 ppm $Ca^{++}$ at room temperature, separation point is not sharp at 70°C), 5 percent Siponate DS-10 (sodium dodecyl benzene sulfonate), 2.5 percent sodium oleate. The test results were similar to those observed with Bryton 430; i.e., separation of surfactant does not occur even with several thousand ppm of $Ca^{++}$ but colloidal $CaCO_3$ is noted.

The functions of $Na_2CO_3$ in these systems are (1) to supply the $CO_3^=$ for reaction with $Ca^{++}$, (2) to provide an anion effect to increase $Na^+$ tolerance, and (3) to provide a buffer effect to compensate for alkali loss in the core. The last function may have contributed to the sharper decrease of oil saturation in the core flooded with slugs containing $Na_2CO_3$.

What is claimed is:

1. In a process in which oil within a subterranean reservoir that contains an aqueous solution of multivalent cations is displaced from one location to another by injecting into the reservoir an aqueous anionic surfactant system which is capable of providing an interfacial tension against the oil of less than about 0.01 dyne per centimeter, the improvement which comprises:
    dissolving in the surfactant system (a) a sodium salt of amino tris(methylphosphonic acid) in a concentration of from about 0.001 to 1 percent by weight of the system, and (b) a multivalent cation-precipitating compound of the group consisting of sodium or potassium salts of carbonates, sulfates, phosphates, or fluorides, in a concentration of from about 0.01 to 0.1 moles per liter of the system; and dissolving said reactants in relative proportions such that, when the system is mixed with the aqueous solution in the reservoir, multivalent cations are reacted with a crystaline-precipitate-forming material to form a substantially colloidal suspension of crystal-growth-inhibited crystals having average diameters that are maintained at less than about 1 micron.

2. The process of claim 1 in which said surfactant system contains at least one surface active sulfonate.

3. The process of claim 1 in which said surfactant system contains a digested alkaline tall oil pitch soap composition produced by heating a mixture of tall oil pitch and excess aqueous alkali for a time and temperature productive of a substantially water-soluble digestion product.

* * * * *